(12) United States Patent
Galgay

(10) Patent No.: US 6,826,027 B2
(45) Date of Patent: Nov. 30, 2004

(54) AUDIO LINE ISOLATOR

(75) Inventor: Peter Galgay, Owen Sound (CA)

(73) Assignee: Edwards Systems Technology, Incorporated, Inc., Cheshire, CT (US)

( * ) Notice: Subject to any disclaimer, the term of this patent is extended or adjusted under 35 U.S.C. 154(b) by 324 days.

(21) Appl. No.: 10/166,173

(22) Filed: Jun. 11, 2002

(65) Prior Publication Data

US 2003/0227727 A1 Dec. 11, 2003

(51) Int. Cl.[7] .............................................. H02H 9/00
(52) U.S. Cl. ........................................ 361/58; 361/67
(58) Field of Search ............................. 361/58, 67, 68, 361/63, 62; 324/509; 307/31, 38, 52; 340/506, 507, 508, 527, 532, 529, 438, 870.07, 870.09, 870.43

(56) References Cited

U.S. PATENT DOCUMENTS

| | | | | |
|---|---|---|---|---|
| 3,652,798 A | * | 3/1972 | McNeilly et al. | 370/224 |
| 4,528,610 A | * | 7/1985 | Payne | 361/62 |
| 4,541,031 A | * | 9/1985 | Ibbetson | 361/67 |
| 4,864,519 A | * | 9/1989 | Appleby et al. | 700/292 |
| 5,097,259 A | * | 3/1992 | Testa et al. | 340/825.36 |
| 5,400,203 A | * | 3/1995 | Tice | 361/62 |
| 5,631,795 A | * | 5/1997 | Koyama | 361/68 |
| 5,801,913 A | * | 9/1998 | Pittel | 361/71 |
| 6,141,195 A | * | 10/2000 | Buhring et al. | 361/67 |
| 6,552,885 B1 | * | 4/2003 | Campbell et al. | 361/45 |

* cited by examiner

*Primary Examiner*—Robert L. DeBeradinis
*Assistant Examiner*—James A Demakis
(74) *Attorney, Agent, or Firm*—Baker & Hostetler LLP

(57) ABSTRACT

A method for isolating suites includes the steps of isolating the suites when an alarm is initiated, setting a timer during isolation creating a window of time to clear a short circuit, clearing said short circuit, removing isolation from the suites as the timer reaches completion, determining if there is a short circuit in each of the suites, and isolating suites that have a short circuit.

11 Claims, 4 Drawing Sheets

AUDIO LINE ISOLATOR

FIELD OF THE INVENTION

The present invention relates generally to audio line isolators. More particularly, the present invention relates to multiple suite audio line isolators.

BACKGROUND OF THE INVENTION

Section 3.2.4.19.10 of the Canadian National Building Code states that damage to or disconnection of an audible signal device in a dwelling unit may not interfere with the ability of devices outside the dwelling unit to sound an alarm.

Existing line isolation devices designed to serve this function in systems using 70 v audio signaling have significant reaction times, require the presence of audio on power-up to perform fault isolation, and require the presence of an audio signal to maintain isolation. These limitations make the existing designs unacceptable for use with amplifiers which have fault sensing capabilities.

Existing designs presently use Polymeric Positive Temperature Coefficient devices, otherwise known as PPTCs, to provide passive isolation of short circuit conditions on audio lines. These devices are thermal in nature, requiring the initial presence of high values of current on the audio line before any isolation can take place. The lower current values associated with 70 v audio and the significantly long reaction times inherent in the nature of PPTCs make them unsuitable for use in this application.

The thermal nature of PPTCs also results in significant sensitivity to ambient temperature conditions. Trip and hold currents for PPTCs typically used in this application are derated as much as 25% over the 0 to 49° C. rated temperature range.

SUMMARY OF THE INVENTION

The present invention operates to perform isolation independent of temperature effects over its rated range.

The device uses a low value resistance in parallel with the detector of an optoisolator to sense peak current values and subsequent loading being presented by the audio signaling devices in a dwelling unit. When the peak current value exceeds a point dictated by the value of the resistor, the output side of the optoisolator becomes active. This activity is sampled and initiates activation of a relay used to isolate the dwelling unit from the audio circuit. Activation of the coil of the relay for approximately 500 uS initiates electronic latching of the isolation relay. Subsequent isolation is independent of the presence of audio, resulting in a device which has a very fast reaction time, and has no reliance on the continued presence of an audio signal to maintain isolation.

An audio amplifier which has fault sensing capabilities will typically not attempt to supply audio into a short circuit condition. A timing circuit is incorporated into this design to activate the isolation relays for the first 2.7 seconds on presentation of the alarm. Momentary clearance of any short that may have been present gives an amplifier with short sensing capabilities a window of opportunity to supply audio. This audio will subsequently be used by the isolator to perform sensing when the timer circuit releases control of the isolation relay.

Supervision switching is designed to be compatible with class A or class B supervision, and allows the use of a single sensing and isolating element to monitor for short circuit conditions in the dwelling unit.

In one embodiment of the invention, a method for isolating suites includes the steps of isolating the suites when an alarm is initiated, setting a timer during isolation creating a window of time to clear a short circuit, clearing the short circuit, removing isolation from the suites as the timer reaches completion, determining if there is a short circuit in each of the suites, and isolating suites that have a short circuit.

In another embodiment of the invention, a line isolator for multiple suites includes a supervisory relay capable of supplying power to suites in series and in parallel, and an isolation relay in communication with the supervisory relay. The isolation relay prevents power from being supplied to a suite. Sense circuitry is in communication with the isolation relay. The sense circuitry determines if there is a short circuit. Latching circuitry is in communication with the sense circuitry. The latching circuitry activates the isolation relay to prevent power from being supplied to a suite when the sense circuitry determines the occurrence of a short circuit. A timer is in communication with the latching circuitry. The timer allows time for a short circuit to be cleared during isolation.

In an alternate embodiment, a line isolator system for multiple suites includes a supervisory relay means for supplying power to suites in series and in parallel and an isolation relay means for preventing power from being supplied to a suite. The isolation relay means is in communication with the supervisory relay means. A sense circuitry means is provided for determining if there is a short circuit and is in communication the isolation relay means. A latching circuitry means is provided for activating the isolation relay means to prevent power from being supplied to a suite when the sense circuitry means determines the occurrence of a short circuit. The latching circuitry means is in communication with the sense circuitry means. A timer means is provided for creating a time period during isolation to allow a short circuit to be cleared. The timer means is in communication with the latching circuitry means.

There has thus been outlined, rather broadly, the more important features of the invention in order that the detailed description thereof that follows may be better understood, and in order that the present contribution to the art may be better appreciated. There are, of course, additional features of the invention that will be described below and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein, as well as the abstract included below, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

DETAILED DESCRIPTION OF THE INVENTION

Figure 1:
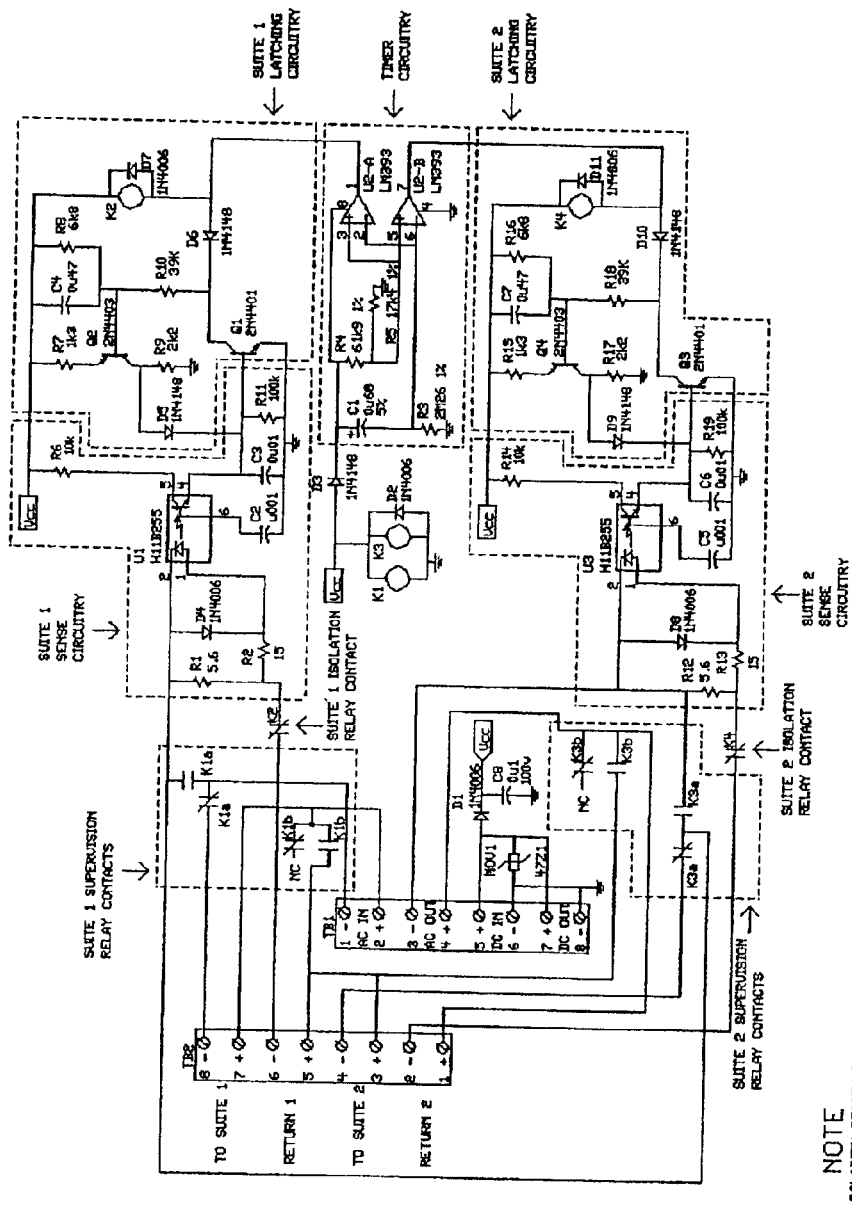
FIG. 1 is a schematic of a dual suite audio line isolator.

FIG. 1 is a schematic of a dual suite audio line isolator. The isolator includes circuitry sufficient to perform supervision, short circuit sensing, and fault isolation for the audio circuitry in two or more separate dwelling units or suites. The dual suite audio line isolator illustrated in FIG. 1 includes timer circuitry, suite 1 and suite 2 latching circuitry, suite 1 and suite 2 sensing circuitry, suite 1 and suite 2 isolation relay contacts, and suite 1 and suite 2 supervision relay contacts. As illustrated in FIG. 1, sensing and isolation circuitry for each suite can be identical.

In an alarm situation the timing circuitry is initiated. The timing circuit includes a dual comparator with open collector outputs (U2) as well as a capacitor C1, and resistors R3, R4, and R5. Resistors R4 and R5 form a voltage divider which provides the positive inputs to the comparators with a reference of approximately 5 v. C1 and R3 form an R-C timing constant, so that the initial voltage at the negative inputs to the comparators is above the fixed 5 v reference, ramping down to sink below the reference voltage after approximately 2.7 seconds have elapsed. The comparators sink current during this time, activating the isolation relays for the first 2.7 seconds on presentation of alarm. Activating isolation for a short period on presentation of the alarm state clears any short circuit condition that may have been present while the system was in its supervisory state. If an amplifier with short circuit sensing capability is being used to supply audio, the implementation of a timer circuit to provide initial momentary isolation on presentation of alarm will allow the amplifier to provide audio. When the start up isolation ends, the device will use this audio to sense any supervisory short that may have been present.

Current sensing on the audio line is performed by R1 (R12) and U1 (U3) (elements in parenthesis refer to identical elements in suite 2). D4 (D8) is present to protect the detector LED of U1 (U3) during reverse biasing, and R2 (R13) is present to provide a measure of current limiting for both diodes. R1 (R12) and the detector portion of U1 (U3) acts as a current controlled switch. Audio current flowing through R1 (R12) causes a voltage drop to be developed across the resistor. When current through this resistor is of sufficient magnitude to cause a peak voltage drop of ±1.5V, current is pulsed through the detector portion of U1 (U3), allowing subsequent pulse of current through the transistor portion of U1 (U3). The use of a resistor as the sense element allows the sensitivity of the device to be changed by changing the value of the resistor. This approach also allows higher sensitivity than was possible with previous designs, which is a major advantage given the low current values associated with 70 v audio. The resistance value incorporated in this application causes the detector portion of the optoisolator to become active on presentation of approximately 75 mA RMS. This results in isolation of a suite if it presents greater than 5 Watts of load to the audio signal circuit.

C3 (C6), R11 (R19), and R6 (R14) perform a short duration sample and hold action on the current pulsing of the transistor portion of U1 (U3). R11 (R19) limits the peak output current of U1 (U3) to approximately 2 mA. This current will charge C3 (C6) to 0.65V within 3.5 uS, at which point the base current of Q1 (Q3), the driver for the isolation relay, becomes significant. The time period required for C3 (C6) to totally discharge through R11 (R19) is approximately 5 mS.

The isolation relay K2 (K4) is latched into its active state by Q2 (Q4) and associated biasing. Activation of latching by the start-up timer is disabled by D6 (D10). When the sense circuit activates Q1 (Q3), current is drawn through the coil of the isolation relay (K2) to initiate activation of the relay. Current is also drawn through the biasing network for the base of Q2 (Q4) through R10 (R18). The values of R10 (R18), R8 (R16), and C4 (C7) are such that Q2 (Q4) will begin to turn on when Q1 (Q3) has been active for 500 uS. Activating Q2 (Q4) drives current through R9 (R17). When the voltage developed through R9 (R17) reaches approximately 1.4V, current is diverted through the base of Q1 (Q3) via D5 (D9), latching Q1 (Q3) on to complete activation of the isolation relay. From this point The isolation relay will remain active When the latching sequence is completed, isolation of the fault becomes independent of the audio signal. This is not the case for previous designs, which require hold current. The audio need only be present for approximately 500 uS for latching to be successfully completed, allowing this device to be used with audio amplifiers that have relatively high speed fault sensing capability. The amplifier may sense the fault and disable its output within the 10 mS it takes for the isolation relay to act, but as long as audio was present for the 500 uS required for sensing and latching, the device will clear the fault. The fact that there is no requirement for hold current on the isolated line makes this design highly suitable for intermittent signals such as voice.

Fire alarm signal circuits are required to be supervised for short circuit and open circuit conditions. This is typically achieved by devising switching so that connection to all devices are in series when the circuit is in its normal, or supervisory state, and connection to all devices are in parallel when the circuit is in its active, or alarm state. In audio applications, all signaling devices are capacitively coupled, so by installing a known resistance at the end of the circuit, application of a known DC current during supervision allows short circuit and open circuit conditions to be sensed by the control panel. The DC circuit used to supply the device is also a supervised circuit. Supervision of the DC circuit used to supply the device is accomplished by providing supervision current of polarity opposite to the supply polarity required to power the device during alarm. D1 provides the supervisory switching by preventing the flow of current into the DC portion of the device during supervision.

There are two classes of supervision; class A and class B. In class A operation the end of the circuit and end of line resistor are brought back to a second set of outputs. In this way, when a single open circuit condition is present the entire circuit can still be actuated during alarm by using both sets of outputs. In class B operation, only one set of outputs is used, so that an open or short can be detected, but the portion of the circuit beyond the open cannot be actuated during alarm. The present invention is suitable for use as an audio line isolator in either class A or class B circuits.

Figure 2:
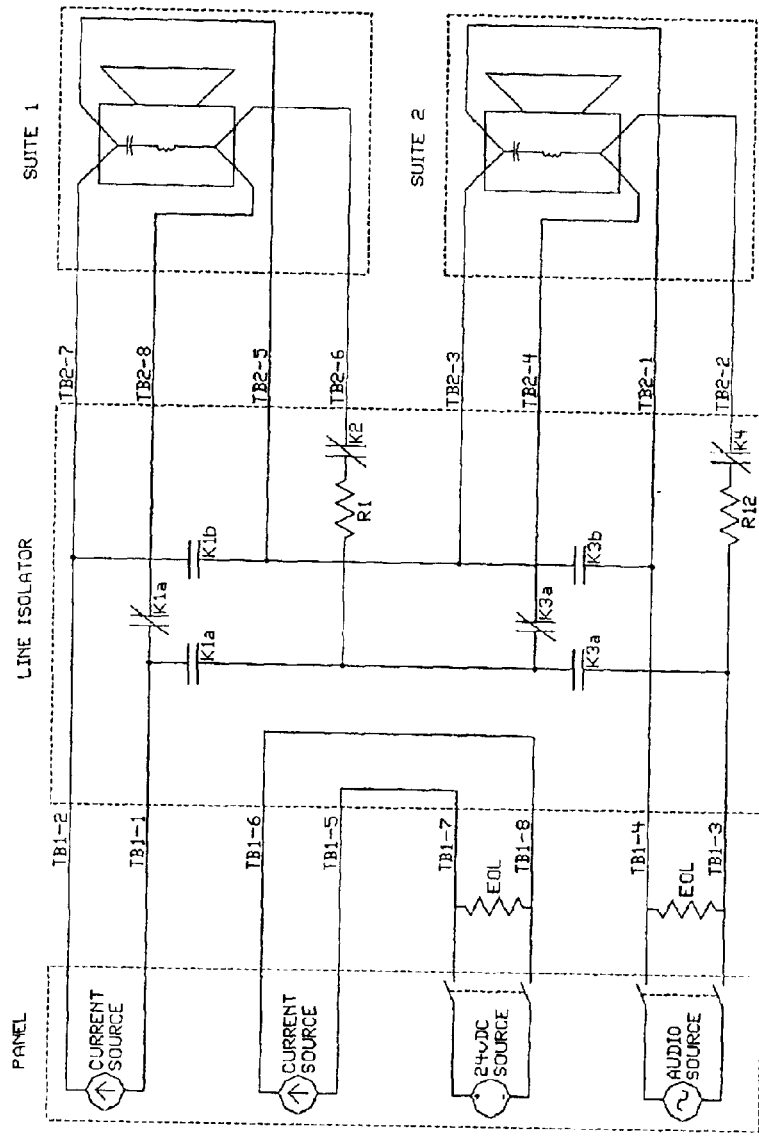
FIG. 2 is a schematic of a dual suite audio line isolator in supervisory mode.

FIG. 2 illustrates supervisory DC current routing for the audio portion of the device. Positive current is input from the alarm panel is via TB1-2. Positive current output to suite 1 is via TB2-7. Return of positive current from suite 1 is via TB2-5. Positive current output to suite 2 is via TB2-3. Return of positive current from suite 2 is via TB2-1. Positive current output to the next device or end of line resistor is via TB1-4. Negative current input is via TB1-1. Negative current output to suite 1 is via TB2-8. Return of negative current from suite 1 is via TB2-6. Negative current output to suite 2 is via TB2-4. Return of negative current from suite 2 is via TB2-2. Negative current output to the next device or end of line resistor is via TB1-3.

Positive and negative supervisory inputs for the DC portion of the circuit are provided by TB1-6 and TB1-5 respectively. Positive and negative supervisory outputs to the next device or end of line resistor are provided by TB1-8 and TB1-7 respectively.

In practical terms, supervision typically requires that there be two possible paths for the supply of power to a signaling device during alarm. The fact that there are two possible supply paths implies that both of these paths must be monitored and opened for successful isolation. In this design, the supervision switching for the audio circuit has been modified by the use of the normally closed contact of K1a (K3a) so that the supervisory path is still valid, but there is only one supply path to the signaling device during alarm. This modification allows the use of a single sensing and isolating element to monitor for short circuit conditions and apply isolation during alarm, rather than the two sensing and isolating elements that would otherwise be required.

Figure 3:
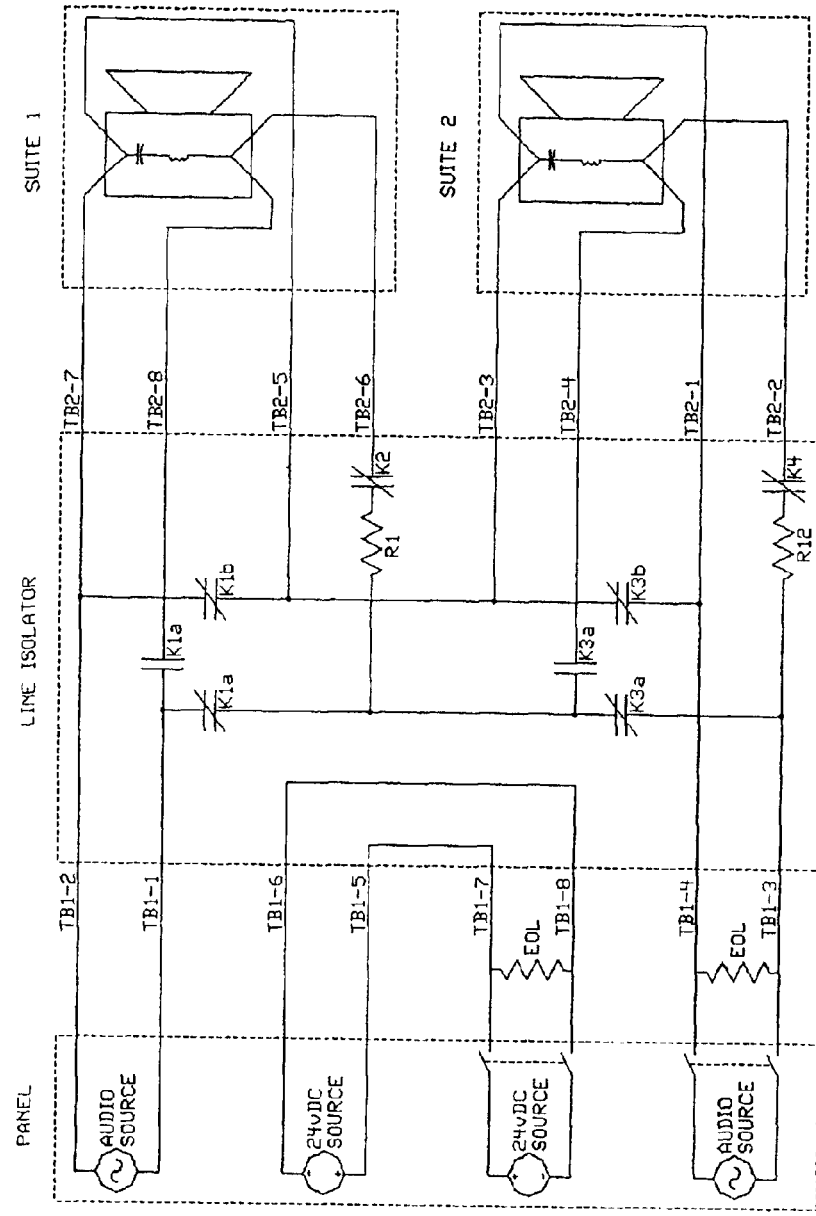
FIG. 3 is a schematic of a dual suite audio line isolator in alarm mode.

As illustrated in FIG. 3, alarm conditions are presented to the device from the control panel by presenting 24 vDC to TB1-5 and TB1-6, then presenting 70 vRMS audio to TB1-1 and TB1-2. Presentation of 24 vDC at TB1-5 with respect to TB1-6 forward biases D1, providing supply current to the device and activating supervision relays K1 and K3. This places the field wiring to the suites in parallel, but opens the supply path to suite 1 at TB2-8, and the supply path to suite 2 at TB2-4. As mentioned above, opening these supply paths allows the use of a single sensing element and point of isolation for each suite. It is noted that the present invention is not limited for use with only 70 vRMS audio applications, but can be used in other applications such as 25 vRMS or DC circuit applications.

Note that in the case of an amplifier with fault sensing capabilities the DC alarm signal presentation should occur at the same time as, or slightly after presentation of the audio alarm signal. Sequencing the alarm presentation in this order allows the amplifier to take full advantage of the start up timer explained below. The device can be used with an amplifier that has no fault sensing capabilities, but DC alarm signal presentation must take place before the presentation of the audio alarm, since presentation of the audio will damage the device if it is de-energized and a short circuit condition is present. This device can be used with either type of amplifier, by appropriately ordering the sequence of alarm signal presentation.

Figure 4:
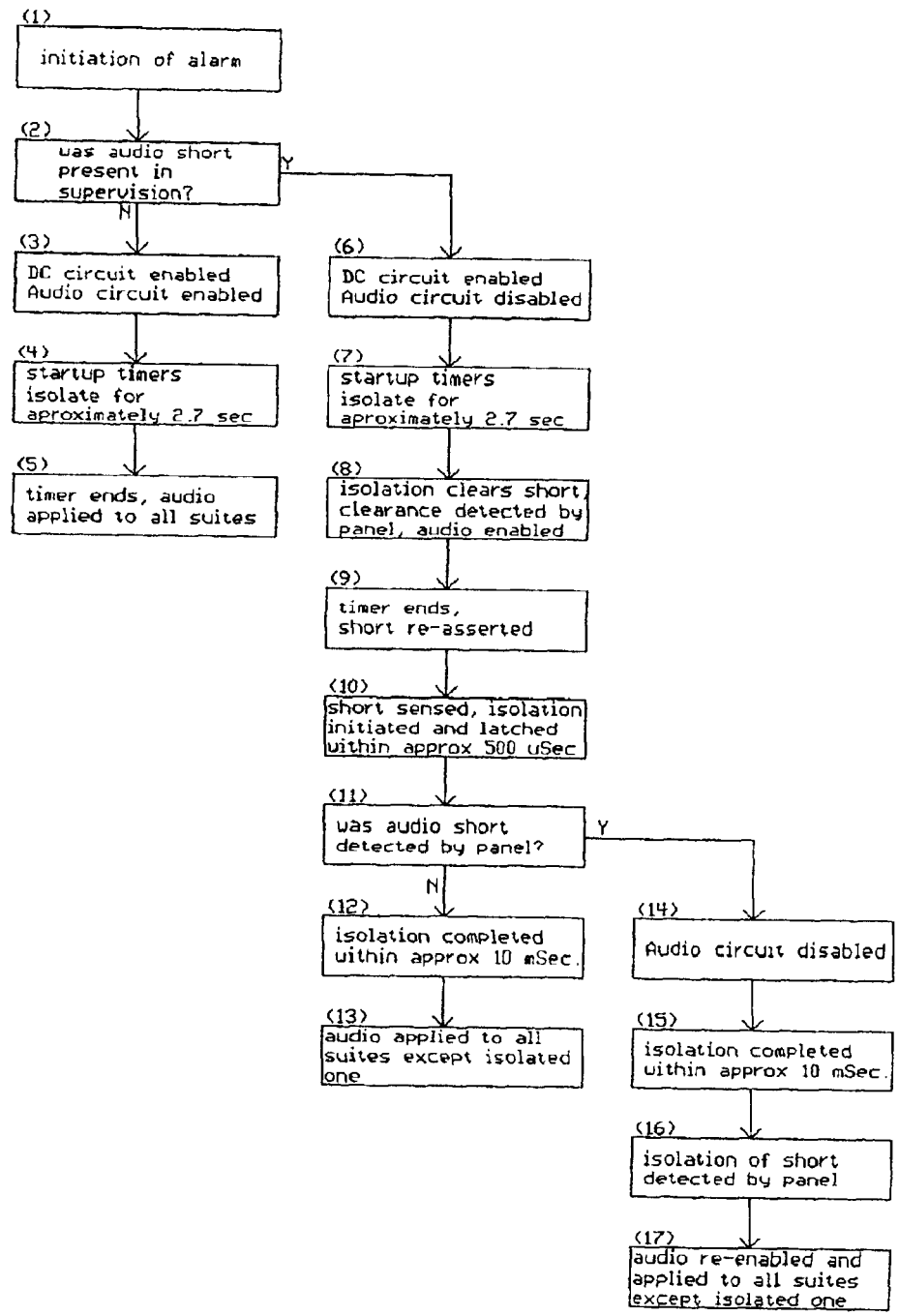
FIG. 4 is a flow diagram illustrating the steps that may be followed in accordance with one embodiment of the present invention.

FIG. 4 is a flow diagram of the method steps of the invention. In step 1 an alarm is initiated by input to the panel. Examples of events which could initiate an alarm include the activation of a pull station, or input from a smoke detector.

In step 2 if there is no audio short is present the logic will continue to steps 3 through 5. Steps 3 through 5 represent the sequence of events if the short was not present. If a short is present the logic will continue to steps 6 through 17. Steps 6–17 represent the sequences which could take place if there was a short circuit condition present on the audio circuit in supervision.

In step 3 since there is no short present on the audio circuit, the audio amplifier will power up normally and supply audio to the circuit. The DC circuit is the power supply for the isolators. Enabling this circuit activates the isolators and initiates the startup timers referred to in step 4.

In step 4, the startup timers are initiated on activation of the isolators in the previous step. This results in isolation of all suites regardless of the presence of a short circuit condition.

In step 5, as the timer on each isolator in the circuit reaches completion, isolation is removed from the suites that the isolator is monitoring. This allows audio to be provided to the suites. Given that there was no short circuit condition present, all suites are provided with audio. The actual sensing of short circuit conditions by the isolators is not relevant for the sequence represented by steps 3 through 5 of the flowchart.

Steps 6 through 17 represent the sequences which will take place if there was a short circuit condition present on the audio circuit in supervision. In step 6, the audio amplifier has sensed that a short circuit condition was present before the initiation of the alarm. The amplifier subsequently does not provide audio, and continues monitoring of the circuit for clearance of the short. The DC circuit is the power supply for the isolators. Enabling this circuit activates the isolators and initiates the startup timers referred to in step 7.

In step 7, the startup timers are initiated on activation of the isolators in the previous step. This results in isolation of all suites regardless of the presence of a short circuit condition. Isolation regardless of the presence of a short circuit is significant here, since the isolator requires the presence of an audio signal to perform short circuit detection. The previous step illustrated that audio will not initially be present if a short circuit condition was present during supervision.

In step 8 isolation of all suites in the previous step cleared the short circuit condition despite the fact that there was no audio present for the isolators to use for sensing. This initial isolation gives the audio amplifier a window of opportunity to provide audio for the isolators to subsequently use for sensing.

In step 9, the isolation of all suites initiated in step 7 times out after approximately 2.7 seconds. At this point, the short that was cleared by the timers is momentarily re-asserted.

In step 10, the isolator responsible for monitoring the suite on which the short is present uses the audio signal to sense the short. Isolation is initiated and the latching circuitry for the affected suite ensures that isolation of the suite is carried to completion regardless of subsequent presence of the audio signal.

In step 11 depending on how robust the audio signal is and the characteristics of the monitoring circuitry in the audio amplifier, the amplifier may sense the short that was re-asserted in step 9 before the isolator can carry isolation of the suite to completion. Steps 14 through 17 outline the sequence of events followed if the amplifier senses the short before the isolator can actuate the isolation relay.

In step 12, isolation is carried to completion within approximately 10 milliseconds of initial sensing of the short. Steps 12 and 13 represent the sequence of events followed if the sense circuitry in the audio amplifier was not fast enough to sense the re-asserted short before the isolator could sense the short and complete isolation.

In step 13, the short circuit condition has now been successfully isolated, and the audio circuit is operating normally to supply audio to all suites except the one on which the short was present.

Steps 14 through 17 outline the sequence of events followed if the amplifier senses the short before the isolator can actuate the isolation relay. In step 14, the short circuit condition has been sensed by the amplifier, and audio has subsequently been shut down. The isolators latching circuitry ensures that isolation is carried to completion despite the fact that audio is no longer present on the circuit.

In step 15, isolation of the short is carried to completion by the latching circuitry of the isolator. At the end of this step the cause of the short circuit condition has been isolated.

In step 16 shortly after isolation of the short circuit condition is completed by the isolator, the amplifier senses that there is no longer a short circuit condition present.

In step 17, having sensed that there is no longer a short circuit condition present on the audio circuit, the amplifier re-applies audio. The short circuit condition has now been successfully isolated, and the audio circuit is operating normally to supply audio to all suites except the one on which the short was present.

The many features and advantages of the invention are apparent from the detailed specification, and thus, it is intended by the appended claims to cover all such features and advantages of the invention which fall within the true spirits and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention.

What is claimed:

1. A line isolator for multiple suite comprising:
   a supervisory relay capable of supplying power to suites in series and in parallel;
   an isolation relay in communication with said supervisory relay wherein said isolation relay prevents power from being supplied to a suite;
   sense circuitry in communication with said isolation relay wherein said sense circuitry determines if there is a short circuit;
   latching circuitry in communication with said sense circuitry wherein said latching circuitry activates said isolation relay to prevent power from being supplied to a suite when said sense circuitry determines the occurrence of a short circuit; and
   a timer in communication with said latching circuitry wherein said timer allows time for a short circuit to be cleared during isolation; and
   said supervisory relay supplies power to said suites using only one supply path during an alarm situation.

2. The line isolator as recited in claim 1 wherein said sense circuitry comprises a resistor as a sense element.

3. The line isolator as recited in claim 1 further comprising an audio disabler in communication with said sense circuitry wherein said audio disabler disables audio if a short circuit is sensed before an alarm is initiated.

4. The line isolator as recited in claim 1 further comprising an audio disabler in communication with said sense circuitry wherein said audio disabler disables audio if an audio short circuit is sensed before an alarm is initiated.

5. The line isolator as recited in claim 1 wherein said supervisory relay supplies power to the suites in series before an alarm is initiated and supplies power to the suites in parallel after the alarm is initiated.

6. A line isolator system for multiple suites comprising:
   a supervisory relay means for supplying power to suites in series and in parallel;
   an isolation relay means for preventing power from being supplied to a suite, said isolation relay means in communication with said supervisory relay means;
   a sense circuitry means for determining if there is a short circuit wherein said sense circuitry means is in communication said isolation relay means;
   a latching circuitry means for activating said isolation relay means to prevent power from being supplied to a suite when said sense circuitry means determines the occurrence of a short circuit wherein said latching circuitry means is in communication with said sense circuitry means; and
   a timer means for creating a time period during isolation to allow a short circuit to be cleared wherein said timer means is in communication with said latching circuitry means.

7. The line isolator system as recited in claim 6 wherein said supervisory relay supplies power to said suites using only one supply path during an alarm situation.

8. The line isolator system as recited in claim 6 wherein said sense circuitry comprises a resistor as a sense element.

9. The line isolator system as recited in claim 6 further comprising an audio disabler in communication with said sense circuitry wherein said audio disabler disables audio if a short circuit is sensed before an alarm is initiated.

10. The line isolator system as recited in claim 6 further comprising an audio disabler in communication with said sense circuitry wherein said audio disabler disables audio if an audio short circuit is sensed before an alarm is initiated.

11. The line isolator system as recited in claim 6 wherein said supervisory relay supplies power to the suites in series before an alarm is initiated and supplies power to the suites in parallel after the alarm is initiated.

* * * * *